US007796471B2

(12) United States Patent
Guigne et al.

(10) Patent No.: US 7,796,471 B2
(45) Date of Patent: Sep. 14, 2010

(54) ULTRASONIC IN-BUILDING POSITIONING SYSTEM BASED ON PHASE DIFFERENCE ARRAY WITH RANGING

(75) Inventors: Jacques Y. Guigne, Paradise (CA); James A. Stacey, Paradise (CA); Nicholas G. Pace, Bath (GB)

(73) Assignee: Intelligent Sciences, Ltd., Paradise, NL (CA)

( * ) Notice: Subject to any disclaimer, the term of this patent is extended or adjusted under 35 U.S.C. 154(b) by 0 days.

(21) Appl. No.: 12/365,981

(22) Filed: Feb. 5, 2009

(65) Prior Publication Data

US 2009/0207694 A1 Aug. 20, 2009

Related U.S. Application Data

(60) Provisional application No. 61/066,611, filed on Feb. 20, 2008.

(51) Int. Cl.
*G01S 3/808* (2006.01)

(52) U.S. Cl. .................. 367/128; 367/127; 367/125

(58) Field of Classification Search ............... 367/125, 367/127, 128
See application file for complete search history.

(56) References Cited

U.S. PATENT DOCUMENTS

| 5,528,232 | A  | * | 6/1996  | Verma et al. ............... 367/128 |
| 5,659,520 | A  | * | 8/1997  | Watson et al. .............. 367/127 |
| 6,176,837 | B1 | * | 1/2001  | Foxlin ....................... 600/595 |
| 6,525,993 | B2 | * | 2/2003  | Wake et al. ................. 367/127 |
| 7,283,423 | B2 | * | 10/2007 | Holm et al. .................. 367/99 |
| 2006/0114749 | A1 | * | 6/2006 | Baxter et al. ............... 367/128 |
| 2007/0070812 | A1 | * | 3/2007 | Lee .......................... 367/128 |
| 2009/0207694 | A1 | * | 8/2009 | Guigne et al. .............. 367/127 |
| 2009/0325598 | A1 | * | 12/2009 | Guigne et al. ........... 455/456.1 |

\* cited by examiner

*Primary Examiner*—Dan Pihulic
(74) *Attorney, Agent, or Firm*—Richard A. Fagin

(57) ABSTRACT

A method for determining position of a mobile electronic device includes emitting an acoustic pulse from the position of the mobile electronic device. The acoustic pulse is detected at a known position at three spaced apart locations along each of at least two lines extending in different directions. The range and phase difference of the acoustic pulse between each of the detecting locations is determined. A relative position of the device with respect to the known position is obtained from the range and phase differences.

12 Claims, 11 Drawing Sheets

ULTRASONIC IN-BUILDING POSITIONING SYSTEM BASED ON PHASE DIFFERENCE ARRAY WITH RANGING

CROSS-REFERENCE TO RELATED APPLICATIONS

Priority is claimed from U.S. Provisional Application No. 61/066,611 filed on Feb. 20, 2008.

STATEMENT REGARDING FEDERALLY SPONSORED RESEARCH OR DEVELOPMENT

Not applicable.

BACKGROUND OF THE INVENTION

1. Field of the Invention

The invention relates generally to the field of geodetic location of electronic devices within an enclosed space. More particularly, the invention relates to ultrasonic techniques for precise location of mobile electronic devices within the confines of a building.

2. Background Art

Determining the position (e.g., in Cartesian coordinates x, y, z) of mobile electronic devices is important in a number of technical fields, or example, global positioning systems (GPS), indoor positioning (and/or tracking) systems (IPS), context-aware (or location-aware) computing systems, augmented reality systems, ubiquitous (or pervasive) computing systems, range-finding systems, navigation systems, autonomous robotic systems, location-based services, enhanced emergency telephone "911" (E911) services, radio frequency identification systems (RFID), smart rooms and offices, and social networking.

The enabling components for position determination are the receiver (sensor or detector) and transmitter (emitter), denoted as Rx and Tx, respectively, in the present description. The operating principle underlying any particular Rx/Tx pair may be based in propagation of sound (ultrasound) or of light (visible, infrared (IR)) or radio frequency (RF)). The medium of transmission between the transmitter and receiver may be through rock (e.g. seismic imaging), water (e.g. sonar), air (e.g. radar) or vacuum (e.g. radio telescope or very long baseline interferometer). The medium characterizes the properties and speed of transmission between the transmitter and the receiver. Any particular Rx/Tx pair may have varying degrees of "intelligence" and span the range of active versus passive operation.

There are two approaches known in the art for the architecture of position determination systems, namely, client-centric and server-centric architectures. Client-centric systems typically provide on-demand delivery of location information to a client device. GPS is an example of a client-centric architecture. Server-centric systems generally are based on external monitoring devices for tracking the position of the mobile electronic device and for storing the position of the device in a database. RFID is an example of a server-centric architecture. The distinction between client-centric and server-centric architectures is important in the context of the privacy and security of persons, places and systems (privacy policy management).

The utility of the Rx/Tx pair for position determination is dependent on the algorithm or method by which the raw physical inputs are processed to yield absolute or relative position. Algorithms such as time-of-flight (range determination), triangulation, multi-lateration, tomography, and interferometry can be used to determine position(s) of one or more devices in one, two or three dimensions at an instant of time (1D, 2D, and 3D) or dynamically with time (4D). The underlying devices may combine analog and/or digital components. Digital systems will have additional complexity based on the digitization, transmission, processing, storage and value-added delivery of digital data and services.

Finally, the increasing availability of location-aware devices is occurring both on desktop computer systems for the home and office as well as mobile devices such as GPS receivers, cell phones and personal data assistants (PDAs). All such devices are increasingly linked via the Internet, which has evolved to support increasingly complex software systems ranging from the early email, remote login and file transfer protocols; the invention of the world wide web (WWW) and browser technology; and most recently the emergence of search engines, web services (Web 2.0) and service oriented architectures (SOA).

The performance of a position determination system determines to a large degree the range of its applications. System performance measures include responsiveness, accuracy, precision, and cost. A commercially acceptable location device typically occupies a niche market based on engineering trade-offs in such performance measures. Added to this are ancillary features of the device relating to calibration, operations, maintenance, and back-end infrastructure.

The deployment of the global positioning system (GPS) and the subsequent commercialization of GPS services have made GPS receivers a widely available consumer electronic device. GPS operates on the principle of multi-lateration calculation from the positions of four or more GPS satellites. The typical accuracy of position measured using GPS is about 15 m (50 ft) for consumer GPS receivers. The inherent limitations of GPS technology are that one is unable to obtain reliable positions within heavily built-up urban centers and the inability of obtaining any position measurement at all inside enclosed spaces such as within buildings. The latter has provided the impetus for indoor positioning systems (IPS) not only to complement GPS but also to enable a broad range of new location-aware applications (for example, smart rooms and offices).

An important incentive for the deployment of location services in mobile electronic devices is the U.S. Federal Communications Commission (FCC) requirement that cellular telephones support enhanced 911 (E911) services. Cellular service providers are required to determine the position of a 911 call from mobile telephones to enable emergency response. The accuracy of current mobile telephone location technology is typically 50-300 meters. The foregoing accuracy has limited utility for emergency response, particularly in the urban environment. Analysts estimate that 50% of cell phones will employ location services by 2010. The deployment of rudimentary location services on cell phones has enabled the creation of social networking services, for example.

The inability of cellular telephone service providers to accurately locate a given mobile telephone has led some to suggest the development of hybrid devices where cell phones also include a GPS receiver. Such a device enables improved location determination only in those areas where GPS is functional, GPS being limited once again in urban centers and inside buildings. A widely deployed IPS would be a candidate technology for being included within hybrid cell phones. It would be desirable for IPS technologies to seamlessly integrate with GPS technology to facilitate the development of hybrid mobile devices.

Another incentive for deploying accurate IPS is "smart room" technology. The deployment of location aware services in high rise buildings, for example, can allow fast and efficient evacuation of residents during fire alarms, provide services (such as indoor navigation) and enhanced quality of life for the mentally disabled, and provide emergency responders with efficient access to information regarding available entrances and exits and provide life-saving navigation and orientation services in zero-visibility environments (a major cause of firefighter deaths is disorientation).

Enterprise resource planning (ERP) systems support some or all of the basic functions of an organization, such as manufacturing, supply chain management, financials, projects, human resources, customer relationship management, decision support and data warehousing. In the retail sector, supply chain management is a key application, with retailers employing increasingly intelligent and location-aware products to manage inventories, suppliers and customers. Typically, an ERP system is underpinned by a single database that manages a vast array of data. Mobile electronic devices are increasingly used to track products at all points in the supply chain and a range of technologies are now employed in retail stores (e.g. point of sale devices) and distribution warehouses (e.g. RFID). Another embodiment of the invention herein could support an ultrasonic frequency identification (UFID) system.

Location systems known in the art include position determination using acoustic pulses underwater and long-baseline technologies in air. Very short baseline interferometry (VSBI) is part of the known art of sonar and radar signal processing (see for example, "*Underwater Acoustic Positioning Systems*" by P. H. Milne). A number of references describe the art of navigation and/or position determination using acoustics in water. U.S. Pat. No. 4,601,025 issued to Lea describes an apparatus for determining the angle of incidence of a received signal using two widely-spaced interferometers with equal-length crossing baselines. The Lea '025 patent points out that interferometric methods have long been in use in the sonar and radar art. The drawback of this invention is the use of "long baseline" interferometry for marine (or submarine) applications. Although high accuracy in position is possible with longer baselines, this feature is undesirable for in-building, in-air devices.

U.S. Pat. No. 4,800,541 issued to Farmer et al. describes a method of determining the bearing angle of a transmitted signal relative to a pair of remote signal receivers separated by several wavelengths of the transmitted pulse. The bearing angle is calculated as a function of the difference in phase of the transmitted pulse received at each receiver. Although the described invention uses the phase difference to calculate a relative bearing angle, the described invention does not purport to measure the range between the transmitter and receiver nor to calculate either absolute range and bearing to determine absolute position. The bearing angle is only calculated in the plane of the receivers and is defined relative to the axis between the receivers. The method does not measure or deliver absolute position in three dimensions as does our invention.

U.S. Pat. No. 5,615,175 issued to Carter et al. also describes a method for determining the bearing angle of an object located at a distance from a reference point. The object emits signals and a method is described by which the bearing angle is calculated using signal energy information rather than time-delay information. Again, this approach cannot provide an absolute measure of position and is not the objective of their approach. The accuracy of our invention is dependent on the multiplicity of acoustic sensors used to receive the signal and this is part of our uniqueness.

U.S. Pat. No. 5,659,520 issued to Watson et al. provides real-time estimation of the positions of multiple cooperative targets and a larger preferred baseline length to improve the time-delay estimates obtained using the known art of VSBI. The receiver array includes a transmitter to "request" a return pulse from the targets. This system uses the round-trip time-difference-of-arrival from the multiple targets to resolve the phase ambiguities arising from the longer baseline. The longer baseline system then has 10 to 20 times the accuracy of the very short baseline navigation technique. The advances to the known art of VSBI described in the Watson et al. patent are not applicable or of value to use in IPS devices. In the context of the present invention, it is only one transmitter target whose absolute position is being determined by the base station (the absolute position of the receiver array is known.

U.S. Pat. No. 6,141,293 issued to Amorai-Moriya et al. describes a method for ultrasonic positioning and tracking. The method depends on a multiplicity of ultrasound transmitters attached to the object being tracked and a multiplicity of background receivers placed at known positions around the tracking (or surveillance) volume. The range between the transmitters and background receivers are processed using prior art referenced therein from the time-of-flight data that is obtained. Position and orientation information is then deduced. A limitation of the device shown in the '293 patent is that the background receivers must be scattered around the volume of surveillance. The disclosed position algorithm employs range information exclusively.

U.S. Pat. No. 6,176,837 issued to Foxlin describes a system for tracking the position and orientation of a body. The '837 patent describes the use of inertial motion tracking of linear acceleration and angular velocity, which are integrated to determine linear velocity, linear displacement, and total angles of rotation. Accumulated drift in the measured values is corrected using methods described therein.

U.S. Pat. No. 7,283,423 issued to Holm et al. describes a method and system for detection, identification and position determination of chips which transmit ultrasound signals in a room. The system is particularly designed for the hospital environment where the emission of RF waves must be stringently controlled. A feature of the disclosed device is a method for correcting for the Doppler shift of signals when the chips are in motion. The system disclosed in the '423 patent does not purport to provide position measurements of the chips with high accuracy; it is deemed sufficient for the most part to localize the devices to within a given room in a building. When positioning to higher accuracy is required a multiplicity of receivers is required and a position is determined by complicated range calculations.

There continues to be a need for accurate position determination of mobile electronic devices within the confines of an enclosed space such as a building.

SUMMARY OF THE INVENTION

A method for determining position of a mobile electronic device according to one aspect of the invention includes emitting an acoustic pulse from the position of the mobile electronic device. The acoustic pulse is detected at a known position at three spaced apart locations along each of at least two lines extending in different directions and the range is determined. A phase difference of the acoustic pulse between each of the detecting locations is determined. The relative position of the device with respect to the known position is obtained from the range and phase differences.

Other aspects and advantages of the invention will be apparent from the following description and the appended claims.

DETAILED DESCRIPTION

1. System Overview

An ultrasonic based system is described herein for locating a transponder inside an enclosed space such as a building. The positioning accuracy in three dimensions is expected to be on the order of a few centimeters. A "base station" ceiling-located device (e.g., in a building) used in the present system has the ability to both transmit and receive ultrasonic signals. The transmitted signal is received by a transponder in a mobile electronic device. The mobile device is programmed to cause the transponder to transmit a signal in response to the signal received from the base station. The transponder's subsequently emitted signal is received by the base station. From the foregoing event sequence the base station measures the round trip time of the transmitted and detected signals, and also the arrival direction. The transit time and arrival direction information enables the position of the transponder relative to the base station to be located in three dimensions ("3D"). Alternatively, an event sequence whereby the transmission of an ultrasonic signal from the client device to the base station may be scheduled in advance (e.g. by the exchange of digital signals over a wireless connection such as Bluetooth) and the one-way transit time and arrival direction information may be processed similarly to enable the position of the transponder relative to the base station to be determined.

The part of the base station including transducers (the ceiling mounted device) is compact, with linear dimensions of the order of 10-20 centimeters. This small size is a consequence of the manner in which the arrival angle is determined, being based on phase differences between several receivers collocated within a single device rather than the time delays measured by a multiplicity of devices scattered throughout the volume of interest. The ceiling-located device preferably contains several individual receivers, transmitters and a temperature sensor. The actual number of receivers and transmitters in any example ceiling-located device depends on the size of the enclosed space and the accuracy desired for the particular system application.

The frequency of the ultrasonic signals emitted in any example will also be dependent on the size of the enclosure and the accuracy desired in the application. The typical frequency used in examples of the present system will be about 40 KHz. Positional accuracies are typically on the order of <5 cm.

Figure 6:
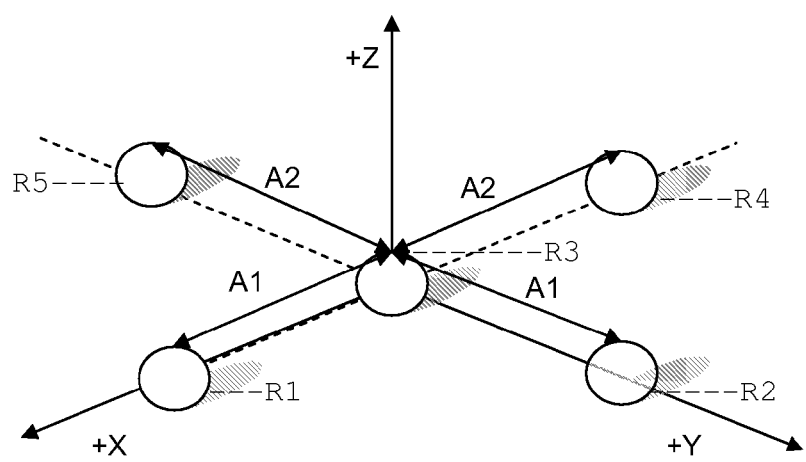
FIG. 6 shows an example transducer arrangement for a base station.

In response to the arrival of a signal at the transponder from the ceiling device, the mobile device transponder transmits a signal consisting of a selected number of cycles at the chosen frequency. In the present example, the signal is received by four receivers in two orthogonal lines in the ceiling mounted device, as shown in FIG. 6.

Typical commercially available ultrasonic transducer elements using a 40 kHz operating frequency have a beam width at −6 dB of 90 degrees, and bandwidths of a few kHz. By locating a plurality of such transducer elements in proximity to each other so as to function effectively as a single transducer, and arranging them in various angular orientations, practical omni-directional sensitivity may be obtained. Such transducers may be used in either or both the base station and the mobile electronic device. As a result, in the following description, all transducers will be assumed to have omni-directional sensitivity.

In one example, a line of transducers can consist of three transducers. The separation between individual transducers is selected wherein the separation A1 between one pair of the transducers and the separation A2 between the other pair of the transducers in the line differs by half a wavelength of the acoustic energy emitted by the transponder (TX-1 in FIG. 1). The sound speed used in the calculation of angles from phase can be more accurately determined by using the relationship of temperature, barometric pressure and humidity to sound speed in air and the temperature, pressure and humidity measured by a temperature, pressure and humidity sensors disposed in the ceiling-mounted device.

Techniques for increasing robustness of the position determination algorithms, given the existence of multiple-path sound reflections (e.g., from walls and other items within the enclosed space) can include the following. A tracking algorithm predicts the trajectory of the mobile device from previously determined positions thereof. Prediction of trajectory can include a verification of the mobile device position determination based on a maximum speed at which the device can move. Also a vertical position range can be defined into which a determined position must fit in order to be valid.

In multiple user situations a transponder only generates an acoustic pulse if it has received a request to do so from the base station, and the pulse must be generated within a predetermined period of time in order to be validated by the base station. Such an identification/response procedure can therefore handle multiple users sequentially rather than simultaneously. In most enclosed spaces the time following a transmission from the location transponder until multiple reflections from the emitted acoustic pulse diminish to an insignificant level is estimated to be about 0.1 seconds. The identification/position determination procedure can be allotted a few tenths of a second in the location process performed in the base station, so that at least one mobile device can be located once per second. A transponder identification procedure may also be part of the transponder position determination.

2. Description of a Specific Example System and Method

Figure 1:
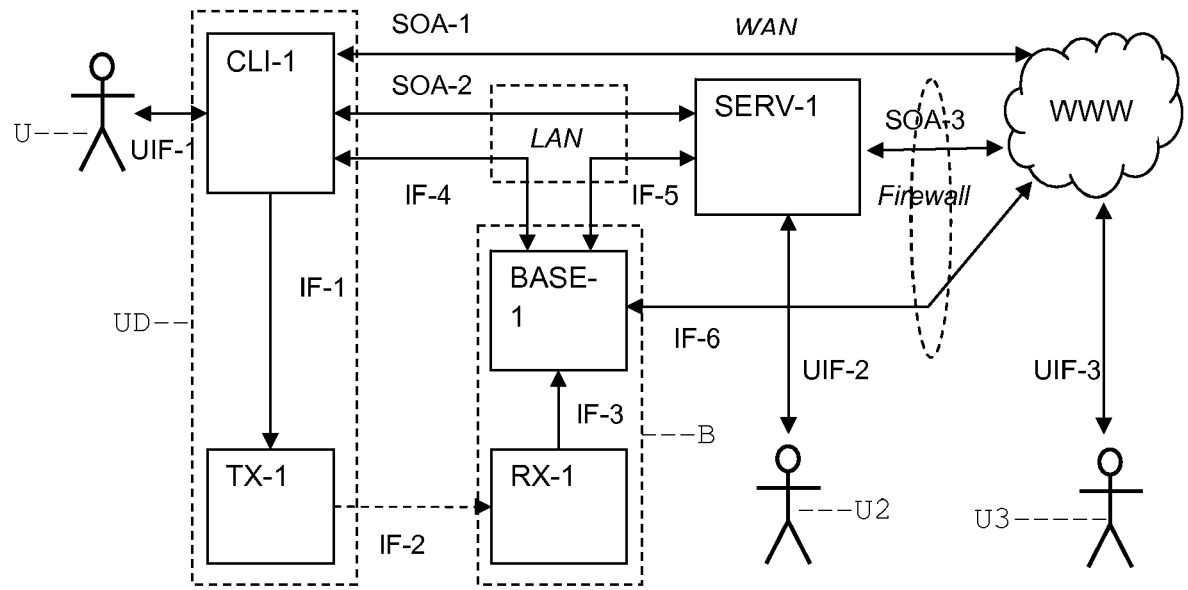
FIG. 1 shows an example mobile electronic device and a position determination system.
Figure 5:
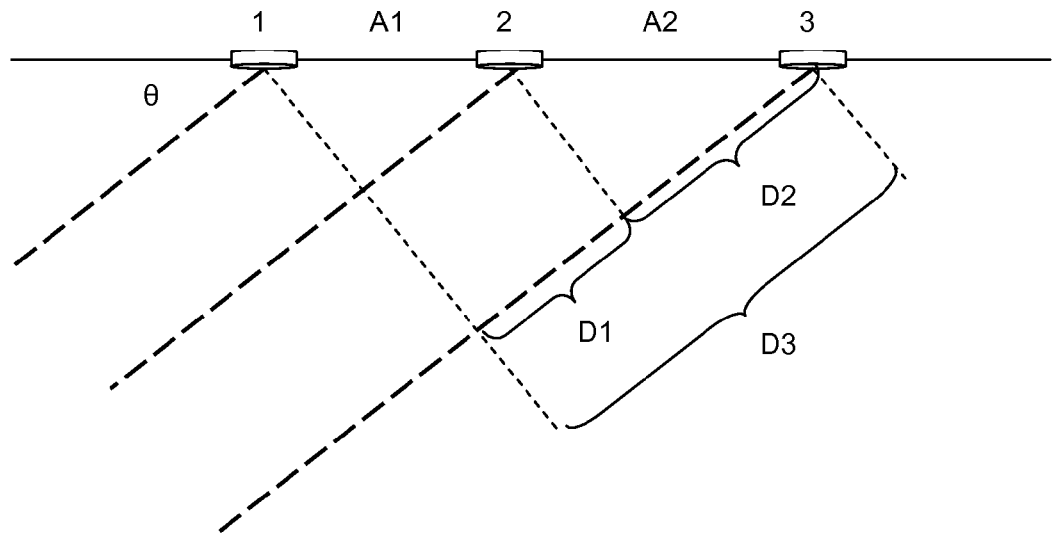
FIG. 5 illustrates a principle of position determination by phase shift.

FIG. 1 shows an example wireless electronic "client" device (CLI-1) the position of which is being determined. The client device CLI-1 may be mobile or stationary, hand-held or otherwise. A transponder unit (TX-1) associated with the client device CLI-1 transmits an ultrasonic pulse, for example, under command input by a device user U (if the device is operated in "client" mode) and/or in response to a command signal sent by a receiving base station BASE-1 (if the device is operated in "server" mode). In typical examples, the client device CLI-1 and the transponder unit TX-1 are physically integrated into a single user device, shown at UD in FIG. 1. A sensor array RX-1 associated with the base station BASE-1 uses ultrasonic transducers arranged in a selected geometric pattern (e.g., shown in and explained below with reference to FIG. 5) that enables the determination of the three-dimensional ("3D") position of the client electronic device CLI-1 by detecting ultrasonic pulses emitted by the transponder unit TX-1.

A processor (FIG. 8) in the base station BASE-1 receives signals generated by the sensor array RX-1, and uses digital signal processing techniques explained below to calculate the 3D position of the client electronic device CLI-1. The 3D position thus calculated may be communicated, for example, to a server, to devices outside the base station BASE-1 and/or to the client device CLI-1. Note that the base station BASE-1 and sensor array RX-1 will normally be integrated within a single device, shown at B in FIG. 1, but such arrangement is not a limit on the scope of the present invention. In practical implementations of a position locator system, network devices (e.g., server SERV-1) can connected to the base station BASE-1 using a LAN or WAN. Important components of the LAN are network hubs (not shown) that define the network topology. One of the functions of the base station BASE-1 may be to provide a wireless hub (not shown in FIG. 1) to facilitate communications with other client devices (See FIG. 11). A mesh network (not shown) may also be used.

A "backend" server SERV-1 can be configured as a portal to the world wide web ("web") WWW and/or a communications network and can delivers location-based services to the client device CLI-1. The WWW and the "cloud" of location-based services are those to which the client electronic device CLI-1 has been enabled.

UIF-1 is a user interface for the client device CLI-1. Users of client devices may be subscribers to location-based services. UIF-2 is a restricted user interface for the backend server SERV-1. Authorized users U2 of the backend server SERV-1 are typically restricted to system support personnel. UIF-3 is a restricted user interface for the web WWW. Authorized users U3 of the web WWW that can gain access to the system and the client device CLI-1 are typically restricted to internet service providers (ISPs). IF-1 can be a unidirectional system interface between the client device CLI-1 and the transponder device TX-1 associated with the client device. The primary function of the system interface IF-1 is to issue the command to the transponder TX-1 to emit an ultrasonic pulse. Command parameters governing operation of the system interface IF-1 will support time delays, pulse shaping parameters, pulse coding parameters, etc. IF-2 is a virtual unidirectional interface between the transponder TX-1 and the sensor array RX-1. The virtual interface IF-2 represents the transport channel for an ultrasonic pulse in air at a given temperature and humidity and attenuated over the path length (or range) separating the transponder TX-1 and sensor array RX-1.

IF-3 is an interface between the sensor array RX-1 and the base unit BASE-1. Each sensing element (see FIG. 5) in the array RX-1 can generate an analog electrical or optical signal related to the response of the sensing element to an ultrasonic pulse generated by the transducer TX-1.

IF-4 is an optional bidirectional interface between the base station BASE-1 and the client device CLI-1. This interface IF-4 may, for example, support the lowest level delivery of location-based services to the client device CLI-1 (e.g., absolute or relative position with respect to the base station BASE-1 independently of the availability of the server SERV-1 or access to the web (WWW). The interface IF-4 may also be used as an alternate means of synchronizing the exchange of ultrasonic pulses between the client device and the base station. IF-5 is a bidirectional interface between the base station BASE-1 and the backend server SERV-1. The server SERV-1 can deliver, for example, value-added location-based services to the client device CLI-1 via an interface SOA-2 in the event that the web WWW is unavailable.

IF-6 is a bidirectional interface between the base station BASE-1 and the web WWW. The interface IF-6 may be configured to deliver value-added location-based services to the client device CLI-1 via an interface SOA-1. Interface IF-6 can support the ability to update the base station BASE-1 software and provide access to the base unit BASE-1 for remote monitoring and control.

The interface SOA-1 is preferably an industry standard interface for delivering web services between the web WWW and the client device CLI-1 independently of the location system. In general, the interface SOA-1 does not traverse a firewall that separates the present location system from the web WWW.

The interface SOA-2 is preferably an industry standard interface for delivering web-based services between the backend server SERV-1 and the client device CLI-1. These services may be a subset or superset of the services the client device CLI-1 might access via the interface SOA-1. Interface SOA-2 can therefore act as a backup to interface SOA-1 for those services delivered from the web WWW and can provide value-added services that may be unique to the present system.

The interface SOA-3 is preferably an industry standard interface for delivering services between the web WWW and the backend server SERV-1. The interface SOA-3 can enable the backend server SERV-1 to be a proxy for the web WWW and can allow remote access to the server SERV-1 for monitoring, control and maintenance via the interface UIF-3.

Figure 2:
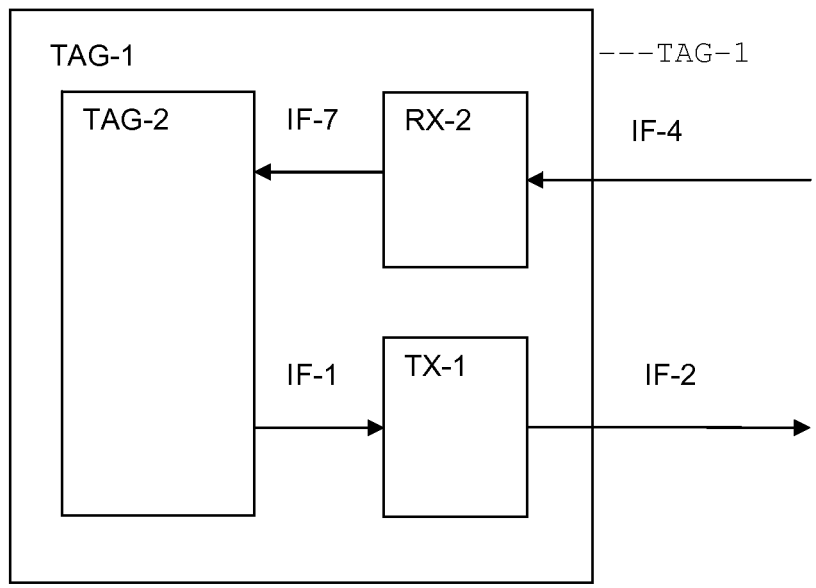
FIG. 2 shows an example "smart tag."

The example client device shown in FIG. 1 may be, for example, a cellular telephone. Other devices subject to location determination that may be used in the present invention include, for example, "smart tags." The smart tag may be an ultrasonic frequency identification (UFID) position tracking device, such as may be used for security purposes and for inventory tracking. When using a smart tag, for example, all of the intelligence of the location system may be configured into the processor (FIG. 8) in base station BASE-1 and/or in the backend server SERV-1. A smart tag has no need for a user interface or web interface. The smart tag can emit an ultrasonic pulse after receiving a "command" to transmit from the base station BASE-1. Referring to FIG. 2, the smart tag, shown at TAG-1, can receive a signal from BASE-1 using the interface IF-4. An example of such a signal would be an IR or RF signal, detected by a receiving transducer RX-2 associated with the tag TAG-1. An advantage of using IR/RF signals is that they are transmitted at the speed of light and can therefore be used to synchronize electronic devices in the tag TAG-1 with the base station (BASE-1 in FIG. 1) to allow the range (distance between the tag and the base station) to be calculated accurately. Receipt of a "command" signal by the transducer RX-2 is communicated over an interface IF-7 to smart tag electronics TAG-2. The smart tag electronics TAG-2 can validate the detected signal as a command sent by the base station and then issue a transmit signal to the transponder TX-1, which would then emit an ultrasonic pulse (over IF-2) to the base station (BASE-1 in FIG. 1). Commercially available smart tags are capable of identifying themselves to another device by transmitting a unique identifier with any communication signal generated therein. All communication (other than acoustic locator signals sent from the smart tag TAG-1 to the base station BASE-1) can take place over the interface IF-4, which in the present example can be bidirectional and use a selected communications protocol. Examples of communication protocols for the interface IF-4 include WiFi, Bluetooth, VFIR (very fast IR) or UFIR (ultra fast IR).

Figure 3:
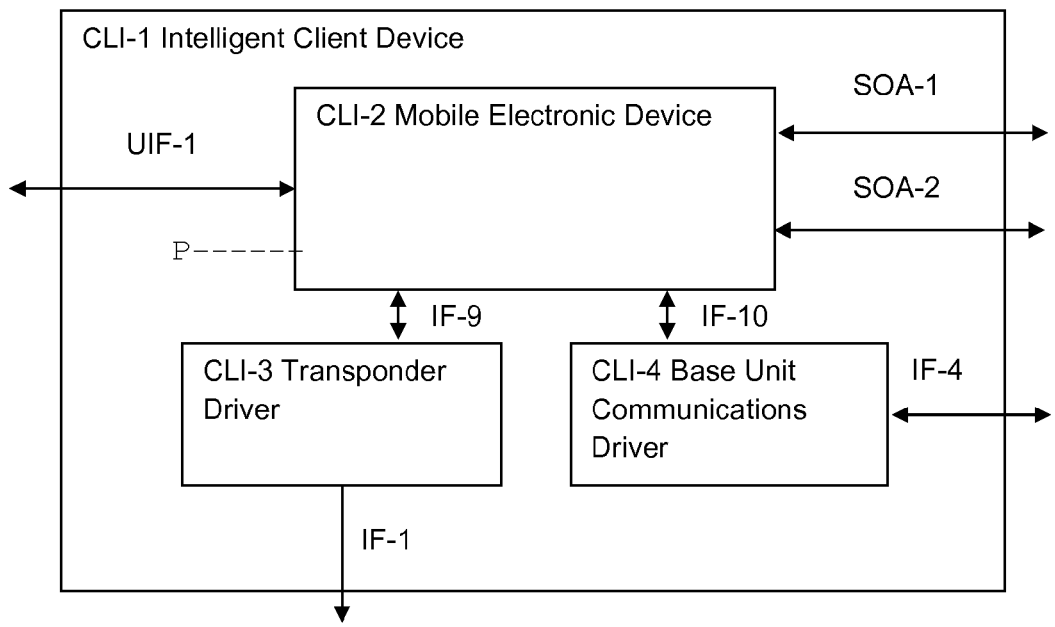
FIG. 3 shows example interfaces for a mobile electronic device including components for the position determination system.

Subsystem components for an example intelligent mobile electronic client device such as the a cellular telephone explained with reference to FIG. 1, or a portable computer, are illustrated in FIG. 3. Either the telephone example or the computer example is capable of supporting a user interface UIF-1 and a communications interface that supports a service-oriented architecture through SOA-1 and SOA-2 (i.e. the mobile device is connected to a WAN/LAN and the operating system supports web services).

All "intelligent" operations will be performed by software CLI-2 running on a microprocessor P in the mobile device CLI-1. For example, a time delay may be randomly chosen if an external request to emit an acoustic pulse is received over any of the interfaces (i.e., for a position tracking application). The position reported to the client device CLI-1 would then have to be corrected by the CLI-2 software for the time delay before being output to the device user (U in FIG. 1) over UIF-1.

Functions performed by the CLI-2 software include synchronizing the timing of ultrasonic pulse transmission with the base station (BASE-1 in FIG. 1); driving the user interface to output the position (and all other information, such as errors) returned by the base station to the client device CLI-1 over IF-4; and providing access to all other services available over interfaces SOA-1 and SOA-2.

Under the command of the CLI-2 software over an interface IF-9, the transponder driver electronics CLI-3 issues commands to the transponder TX-1 over the interface IF-1. The commands can include the following: transmit pulse parameters such as time delay, pulse shape and pulse coding parameters and if interface IF-1 is uni-directional. Reporting of errors (e.g. no acoustic locator pulse received by the base unit) can be communicated over the interface IF-4.

A base station communications driver CLI-4 implements a bi-directional digital communications interface between the client device CLI-1 and base unit BASE-1 for information other than the acoustic locator pulses. Industry standard communications protocols could use one or more different technologies such as infrared (IR) or radio frequency (RF) communications using industry standard protocols (IRDA, WiFI, Bluetooth). Another option would be to implement communications using ultrasound (US) by modulating the US carrier frequency.

Information to be communicated from the communications driver CLI-4 over the interface IF-4 can include (but not be limited to) a unique identification code for the client device; a request to send ultrasonic pulse (if the devices is operated in client mode); acknowledgement of signals received by client devices (as part of communications protocol); parameters for the ultrasonic locator pulses (e.g., time delay, pulse shape, pulse code) and error codes. Information to be communicated to CLI-4 over the interface IF-4 can include (but not be limited to): a unique identification code for the base station; A request to send ultrasonic pulse (operated in server mode); acknowledgement of signals received by base station (as part of communications protocol); parameters for the ultrasonic pulse (e.g. time delay, pulse shape, pulse coding); error codes; and the relative or absolute position of the client device CLI-1

The Transponder TX-1 emits ultrasonic pulses under command of the client device CLI-2. In practice the transponder would be physically integrated with the client device and share resources such as power.

Figure 4:
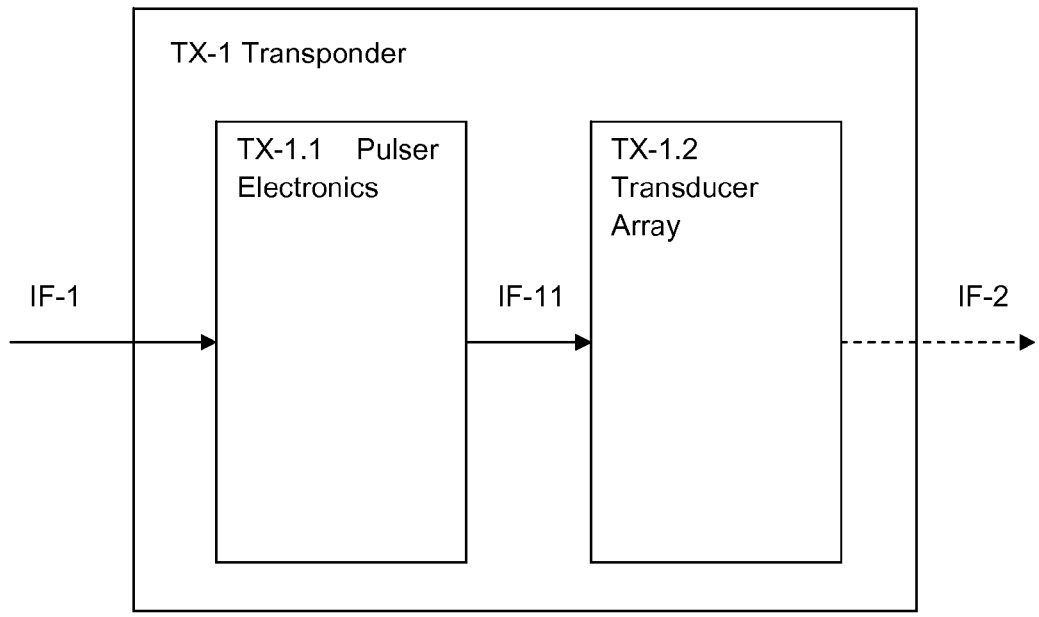
FIG. 4 shows an example ultrasonic transponder system for position determination.

The TX-1 transponder is illustrated in FIG. 4. The TX-1 Transponder receives commands over the interface IF-1 from the transponder driver (CLI-3 in FIG. 3). These commands are input into the pulser electronics subsystem TX-1.1 The pulser electronics subsystem TX-1.1 drives a transducer TX-1.2 over an analog interface IF-1. The primary function of the pulser electronics subsystem TX-1.1 is to provide a programmable pulse with known values of delay time, pulse shape and/or pulse code. An example pulse can be a sinusoid of 5-10 cycles.

The IF-11 interface is an analog interface delivering power to the transducer array TX-1.2. Signal voltages driving the array TX-1.2 can vary considerably but the value should be sufficient to drive an ultrasonic transducer to emit an ultrasonic pulse that can be detected by the base unit at a distance of about 10 meters (33 feet). The output ultrasonic pulse is emitted by the transducer array TX-1.2 over interface IF-2 (corresponding to the transmission of acoustic pulses in air). The acoustic pulse will have transmission properties that are a function of the speed of sound (dependent on temperature, pressure and humidity) and attenuation of the pulse as a function of carrier frequency (nominally 40 KHz), temperature, pressure and humidity.

The transducer array TX-1.2 can consist of a plurality of individual transducers that enables an acoustic pulse to be emitted over a large solid angle, as explained above. The ideal solid angle is $4\pi$ (full coverage), but in practice the transponders device may emit a pulse with a finite beam width and direction. In such case, the transponder would need to be oriented in the direction of the base unit for optimum performance (line of sight operation). Note that the power requirements for the client device will be dependent on the number of transducers that need to be driven.

The geometry of the ultrasonic receive array (RX-1 in FIG. 1) is a unique feature of this system, that allows a longer baseline array to be employed without phase ambiguities. In the present example, and referring to FIG. 6, the array includes a single axis line array of three transducers R1, R3, R4 is where sensors R1 and R3 are separated by a distance A1 and sensors R3 and R4 are separated by A2, where the difference between A2 and A1 is exactly half a wavelength of the carrier (4.25 mm at 40 KHz). A second line of transducers R2, R3, R5 may be oriented orthogonally to the first line of transducers and may have similar spacing characteristics as the first line of transducers.

Referring again to FIG. 5, the acoustic pulse is effectively arriving from infinite distance (a distance very much greater than the transducer separation A1+A2). The path length differences D1, D2 and D3 result in phase differences between the received pulse at each transducer, from which the bearing angle θ is then calculated. The present situation is known as the "far-field" case.

The beam pattern of an individual transducer limits the direction of coverage of that transducer for detecting acoustic signals. It is therefore important to orient the transducer to provide optimum sensitivity of the array within the volume of interest. To obtain coverage over the entire volume of interest, a plurality of individual transducers may be substantially collocated at the positions shown in FIG. 6, for example, and each oriented to scan particular subsets of the total volume. As noted above, such grouping of transducers would provide the equivalent of an omni-directional sensor. In the discussions that follow, omni-directional sensors are again assumed.

Figure 7:
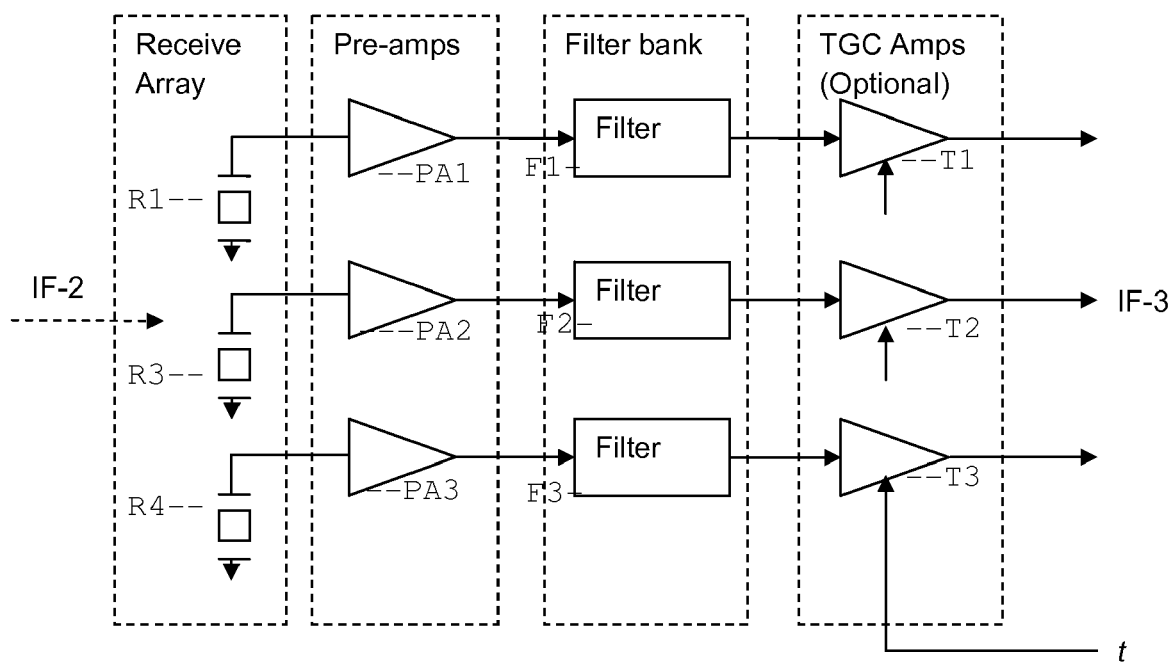
FIG. 7 shows a block diagram of receiver components in the base station.

A schematic of the receive array electronics is illustrated in FIG. 7. Although only three transducers R1, R3, R4 are shown in the receive array (corresponding to one line array in FIG. 6), it will be appreciated by those skilled in the art that the signal conditioning devices shown in FIG. 7 can be duplicated for each transducer element.

Ultrasonic pulses incident on each transducer R1, R3, R4 in the receiver array (over interface IF-2) are amplified by respectively coupled pre-amplifiers PA1, PA2, PA3. The output may be optionally band-pass filtered using respective analog filters F1, F2, F3 and then passed to respective time-gain compensation (TGC) amplifiers T1, T2, T4. The use of TGC amplifiers is optional and may be eliminated through appropriate digital signal processing algorithms.

The TGC amplifiers T1, T2, T3 apply a gain that is proportional to the time from the ultrasonic pulse emission. This compensates for attenuation of the acoustic pulse in air (as a function of humidity and temperature) as it traverses from the transponder (TX-1.2 in FIG. 3) to the transducers R1, R3, R4. Note that this TGC operation may be implemented in the base station digital signal processing (explained below with reference to FIG. 9). The analog outputs are communicated over interface IF-3 to the base station for digital signal processing explained below.

Figure 8:
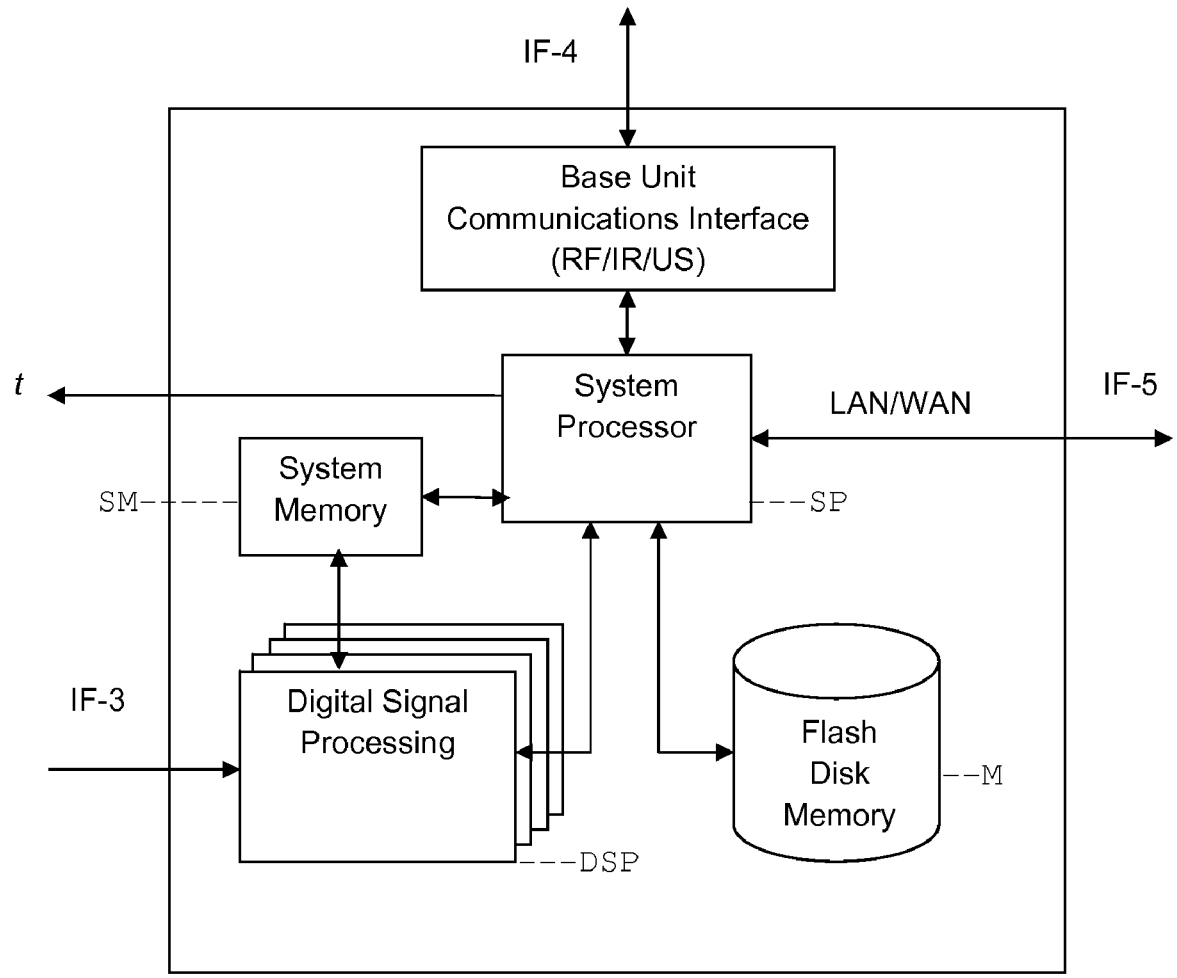
FIG. 8 shows a block diagram of example base station components.

The base station (BASE-1 in FIG. 1) processes the signals detected by the RX-1 receiver array corresponding to ultrasonic pulses emitted by transponders and/or smart tags. The base station is configured to calculate the position of the client device or tag. Referring to FIG. 8, the base unit performs the digital signal processing of the signals received over IF-3 from the receive array under the control of a system processor SP. The system processor SP controls all subsystem components and creates a high level interface to external LAN/WAN via interface IF-5. The bi-directional communications interface IF-4 closes the two-way communications loop with the transponder using IR, RF or US. It is over this interface IF-4 that important device identification, time synchronization and communication of pulse shape and code parameters are conveyed to the base station's system processor SP. The communications protocol over IF-4 may be proprietary or non-proprietary (IRDA, WiFi, Bluetooth, etc.). All digital signal processing output is stored in a system memory SM, which is accessible by both the system processor SP and a digital signal processor DSP. A system disk memory M subsystem is indicated as using flash memory (as opposed to magnetic disk). This flash disk M could be large enough in capacity to allow the base-unit to act as a server of location aware services. It is assumed that the system processor SP employs a central processing unit, random access memory, and LAN/WAN interfaces and associated drivers.

Figure 9:
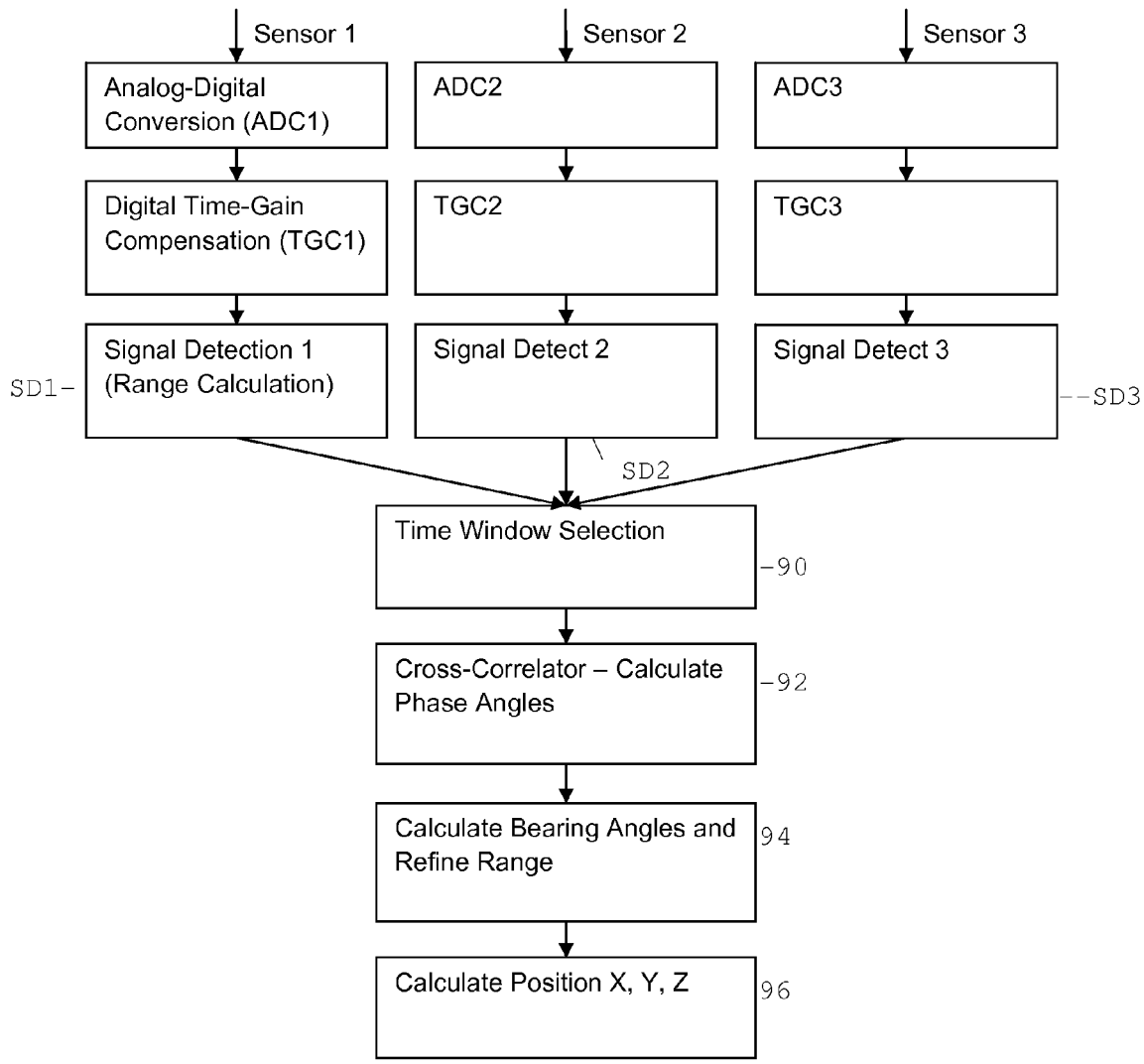
FIG. 9 shows a flow chart of an example signal processing technique for range and direction determination.

The functions performed by the base station DSP subsystem are illustrated in flow chart form in FIG. 9. Analog signals from each transducer (only one line array is illustrated in the figure) SENSOR 1, SENSOR 2 SENSOR 3 are input to the DSP subsystem. The steps in the DSP process can include the following. The respective analog signals from each sensor are digitized by an analog-digital converter, as shown at ADC1, ADC2, ADC3. The sampling rate in the present example can be 10 MHz (0.1 microsecond per sample). The sampling rate should be chosen to optimize the signal-to-noise ratio (SNR) and allow precise determination of phase angles as explained below. A 10 meter range then corresponds to about 300 kilo-samples. Assuming 2 bytes (16 bits) per sample implies 600 KB of data per sensor will be stored in the system memory (SM in FIG. 8).

Temperature, barometric pressure and humidity define the attenuation of the signal with time of pulse travel. Each time series may optionally be corrected for attenuation as shown at TGC1, TGC2, TGC3.

The first time of arrival for each signal pulse is detected, as shown at SD1, SD2, SD3. This is a complex algorithm involving time-frequency analysis, feature extraction, and pattern classification (pulse or no pulse). An approximate value of the range will be obtained from a coarse segmentation of the received data into time windows for which the signal to noise is measured. All measures of signal are characterized in terms of a noise profile obtained from the data obtained for each receiver.

A more precise determination of arrival time can be performed by finding, at 90, the time window in which the signal to noise ratio exceeds a pre-defined threshold followed by refinements based on an analysis of the envelope of the received signals. In this way the arrival time is found to within one cycle. The algorithm accommodates the effect of the presence of large, long time multiples which might cause confusion. The algorithm is able to deal with both short time and long time multiples.

Once the arrival time is determined for each transducer signal then a window of a predetermined number (e.g., sixteen) of cycles is set up in which the phase differences are obtained, at 92, by a narrowband phase difference determination method.

The TDOA spectra obtained represents phase differences with phase ambiguities arising from the periodic nature of the signals.

At 94, bearing angles from two orthogonal line arrays are calculated and the range calculation is refined. The unique geometry of the line arrays eliminates the phase ambiguities in this calculation. Cartesian (X, Y and Z) coordinates of the client device or smart tag are then calculated from the range and bearing data. The Cartesian coordinate data can be stored in the system disk (flash memory) in a web WWW accessible format, or displayed, such as on a display (not shown separately) forming part of the mobile device (e.g., CLI-1 in FIG. 1).

Figure 10:
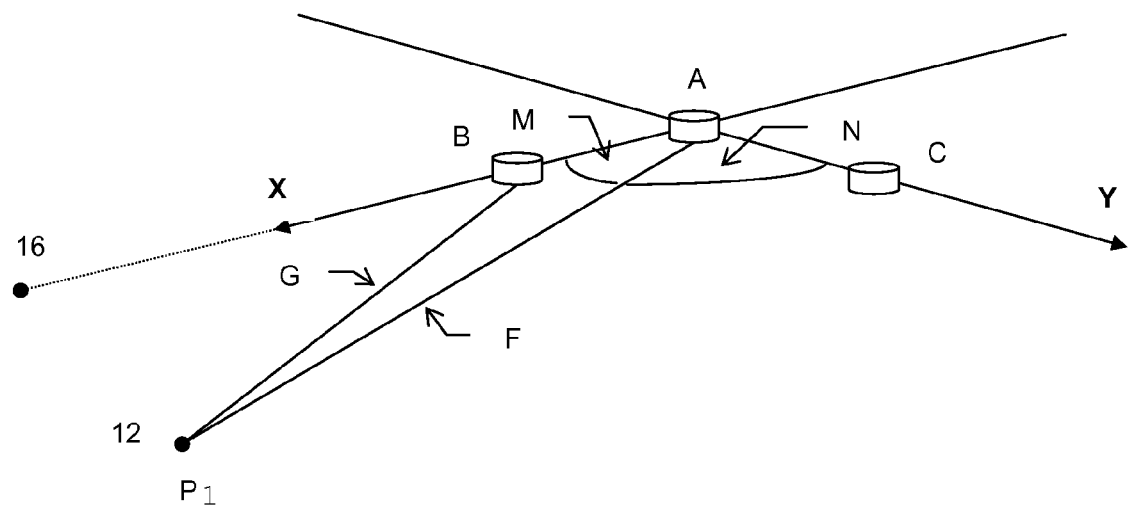
FIG. 10. Shows a geometric representation of determining position as explained with reference FIG. 9.

FIG. 10 illustrates the positioning calculation for a very short baseline interferometer with three receivers A, B, C oriented along the X and Y axes as two line arrays AB, AC, where the receivers in each line array are separated by at most half a wavelength. If an object PI is at the position shown at 16 (along the X axis), then the arriving pulse at receiver B is 180 degrees out of phase with the arriving pulse at receiver A. 180 degrees in phase corresponds to the half-wavelength separation between A and B. This characterizes the method of very short baseline interferometry. Only when the separation between A and B is less than or equal to half a wavelength can the phase difference unambiguously determine the arrival angle M. When the object P1 is at point 16, angle M is zero. When the object P1 is at point 12, for example, angle M is greater than 0 and less than 180 degrees. In a similar way, the line of receivers AC along the Y-axis may be used to determine the angle N. Again, when an object is at point 12, angle N is greater than 0 and less than 180 degrees. When the object is located anywhere in the volume below the X-Y plane, the problem of determining the position becomes three dimensional. Angle M is then measured relative to the positive X-axis in the plane defined by the points BAP. Angle N is then measured relative to the positive Y-axis in the plane defined by the points CAP.

Both angles M and N must be measured to resolve ambiguities in position arising from the measurement of angles. Therefore the receiver array must have at least one receiver line along each of the X and Y axes (or two independent directions in general).

By trigonometry, the three dimensional position of the object may be determined from the range F and the angles M and N. cos(M) and cos(N) are the direction cosines relative to X and Y axes respectively. By digital signal processing, the phase angle difference can be measured by the time delay that brings pulses received at receivers A and B into synchronicity. The invention described herein advances the state of the art by locating 3 receivers along each of the X-axis and the Y-axis, as shown in FIG. 6.

The novel aspect of the proposed receiver array is that the separation A1 and A2 between each receiver is greater than the half wavelength characteristic of VSBI, but the difference in the separation A2−A1 is still one half wavelength of the acoustic energy. The foregoing geometry allows resolution of the ambiguity in the phase angle arising from a larger separation between the receivers, to allow the 3D position of the object to be determined with greater precision than is possible with VSBI alone.

Thus the arrays that will be discussed below are grouped into a minimum of three transducer elements (larger numbers are possible, but these increase cost and power), along each of the X and Y axes.

Figure 11:
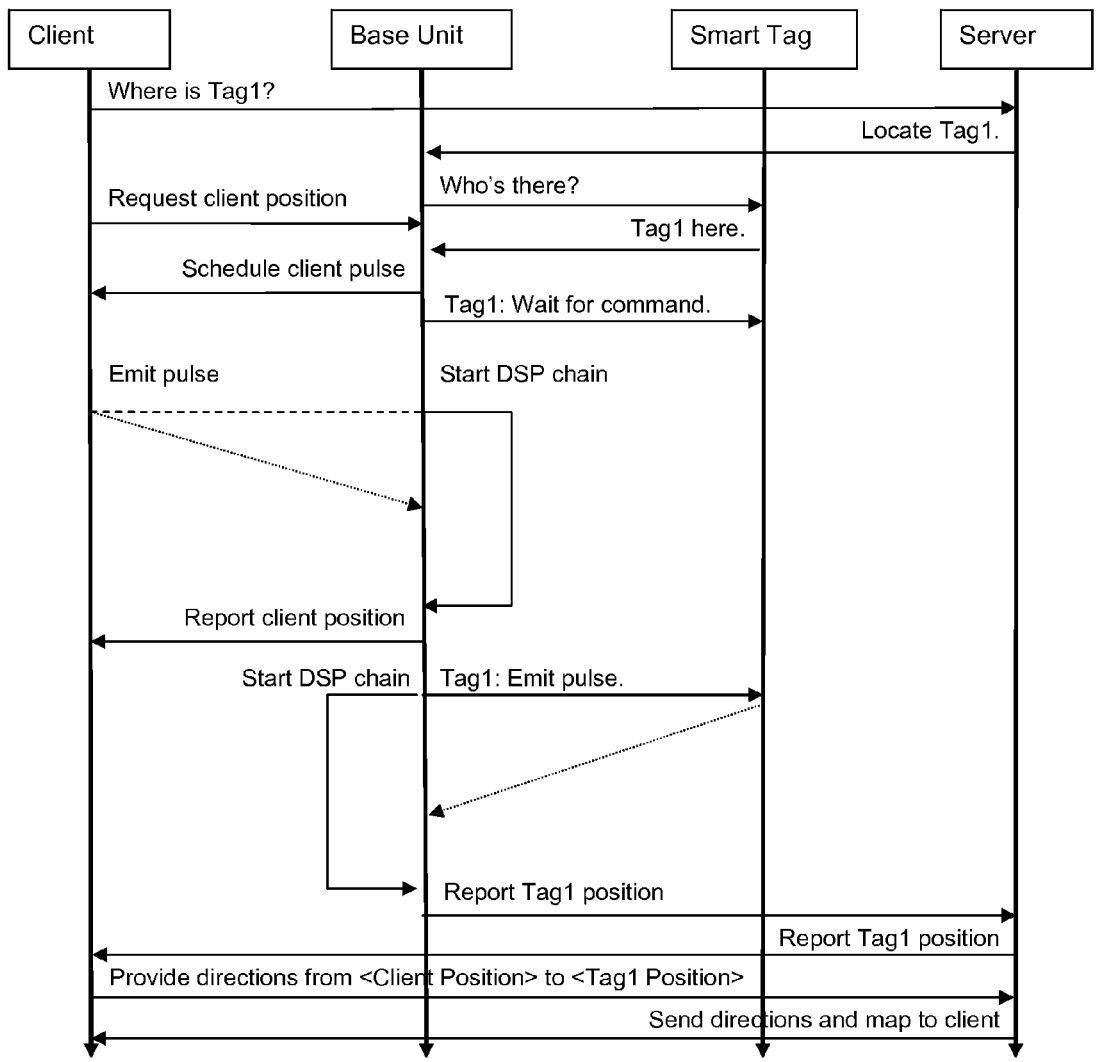
FIG. 11 shows an example of communication protocol when using a system with more than one mobile electronic device.

In FIG. 11, interaction of a client device or smart tag with the base station (BASE-1) and server (SERV-1) is illustrated. Generally, smart tags operate in server mode (tag positions are tracked by the server) and client devices such as mobile telephones operate in client mode (the client device CLI-1 requests services from base units and servers).

The interaction between all potential client devices, smart tags, base stations, and servers (local servers and ISP servers) necessitates a high level communications protocol (e.g. Bluetooth) to deliver a high quality location-aware service. The communications protocol has to be able to accommodate both sophisticated client devices but also relatively less sophisticated devices like smart tags.

Note that, generally, client position data is maintained privately within the client device unless a service is requested of the server by the client device. In contrast, smart tags can be tracked on an ongoing basis by the server, by request or periodically according to server tracking software requirements.

Not shown in FIG. 11 for clarity of the illustration are all the possible interactions between the client devices and/or smart tags relating to providing security, such as providing authentication, identification, encryption of services (particularly audio streams), etc.

Note also that two methods of synchronizing the DSP process with the emission of acoustic pulses are illustrated. For intelligent devices with sophisticated embedded computer electronics, it is possible to schedule a time for pulse emission that is synchronized with the start of the DSP process. For simpler devices such as smart tags, it may not be practical to synchronize timing in advance, hence, a simpler device such as a smart tag might have only to emit a pulse on command from a base unit.

Figure 12:
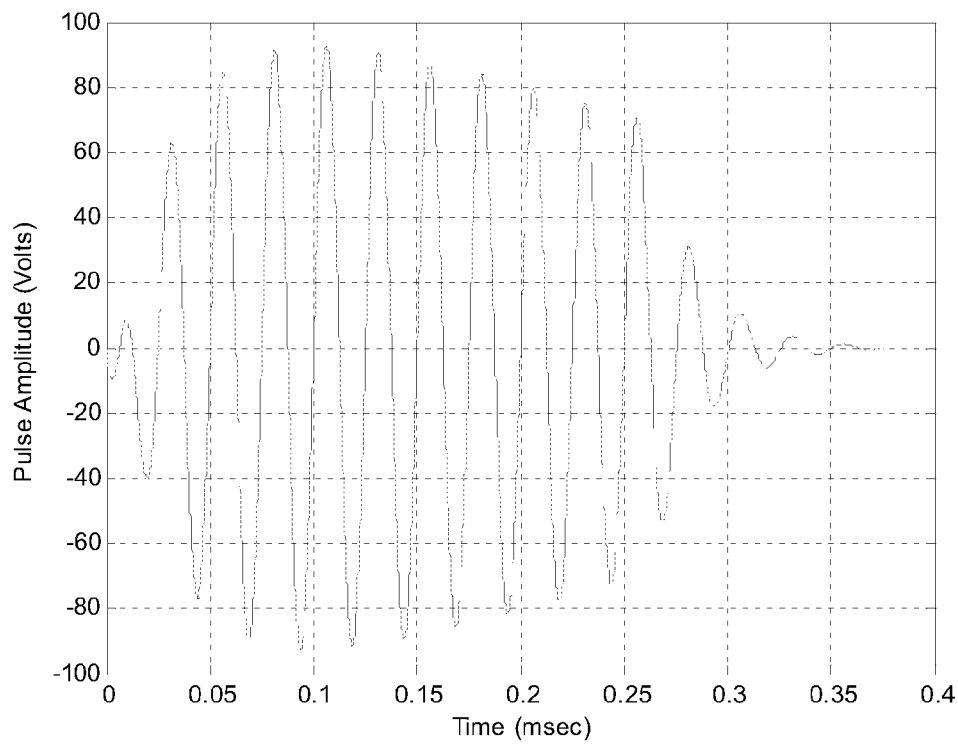
FIG. 12 shows an example transducer pulse waveform.

With a high level communications interface between the base station and the transponder, there is reduced need to employ pulse coding or pulse shaping techniques. The base station can be programmed to determine the identity of the transponder by RF or similar non-located communication signal, and when the transponder will emit an acoustic pulse. Therefore, it is possible to use the same pulse shape or code for all transponders. This simplifies the design. The acoustic pulse can be, as explained above, a fixed length pulse with the following characteristics. The pulse is emitted at the central frequency of the transducer (nominally 40 KHz) and all its "energy" should be within a small bandwidth of the center frequency The pulse will have a finite rise-time due to the response of the transducer. The pulse has a finite ring-time after the driving voltage has been removed from the transponder The pulse has a range of frequencies within a narrow band around the center frequency. The voltage driving the transducer is typically in the range of 100-150 Volts. A pulse of 10 cycles duration with the foregoing properties is illustrated in FIG. 12. The ranging algorithm outlined above does not require a pulse longer than 16 pulses.

Figure 13:
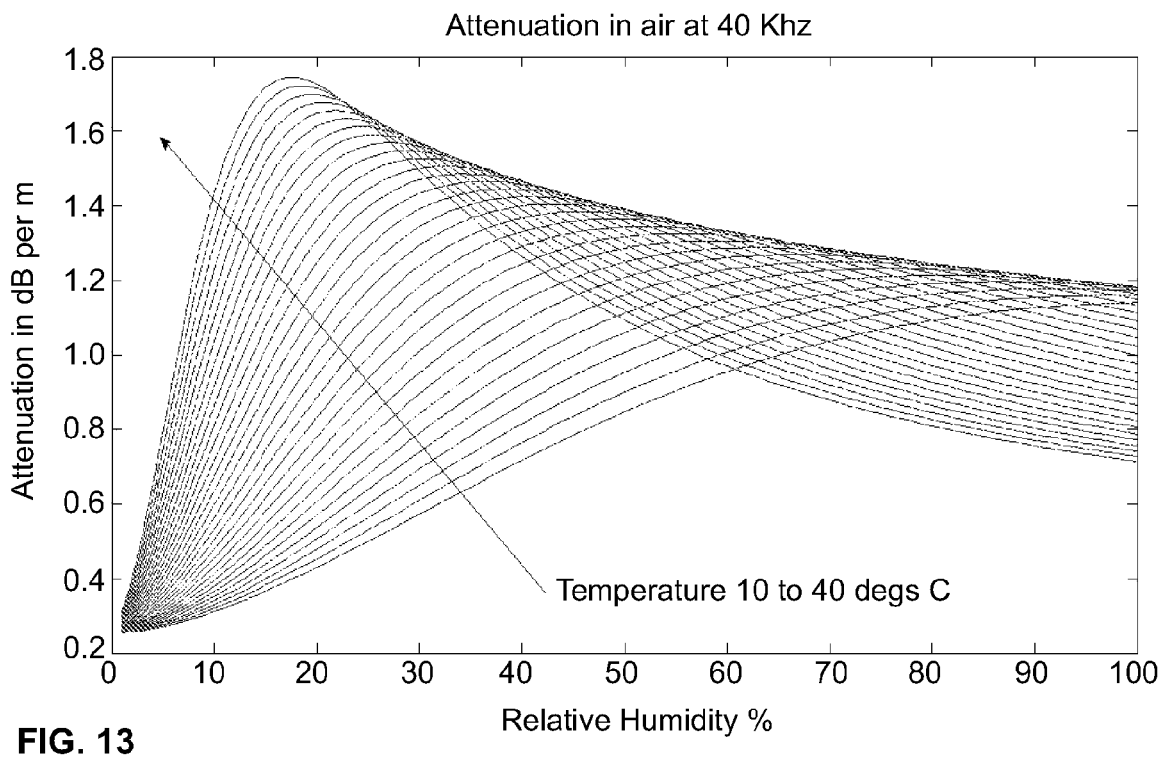
FIG. 13 shows a graph of attenuation of 40 Khz acoustic energy with respect to temperature and humidity.

There will be attenuation of the transmitted ultrasonic pulse due to geometric effects such as the finite beam profile of the transmitter transducer(s); the solid angle of the transmitting transducer relative to the receiving transducer; the attenuation of the pulse through air as a function of temperature, pressure and humidity; miscellaneous gains and efficiencies relating to the transducers themselves; and the finite beam profile of the receiver transducer The attenuation of the beam as it travels through air is a complex function of the temperature and humidity, as shown in FIG. 13 (the dependence on pressure is not shown). A number of miscellaneous factors can affect the signal amplitude generated by the received pulse, including the efficiencies (gains) of the Tx and Rx transducers and any mismatch in the Tx and Rx transducer impedances. The attenuation factors outlined above are generally a function of the range between the transmitter and receiver and determine the form of the attenuation function. Knowledge of the function is important for the time-gain compensation, discussed below.

The rationale for time-gain compensation (see FIG. 9) is to normalize the voltage of the received pulse to a preselected value (e.g., +/−1 volt peak to peak). Normalization simplifies later digital signal processing. With the increasing dynamic range of analog-to-digital converters, the implementation of TGC in an analog processing circuit is optional.

Figure 14:
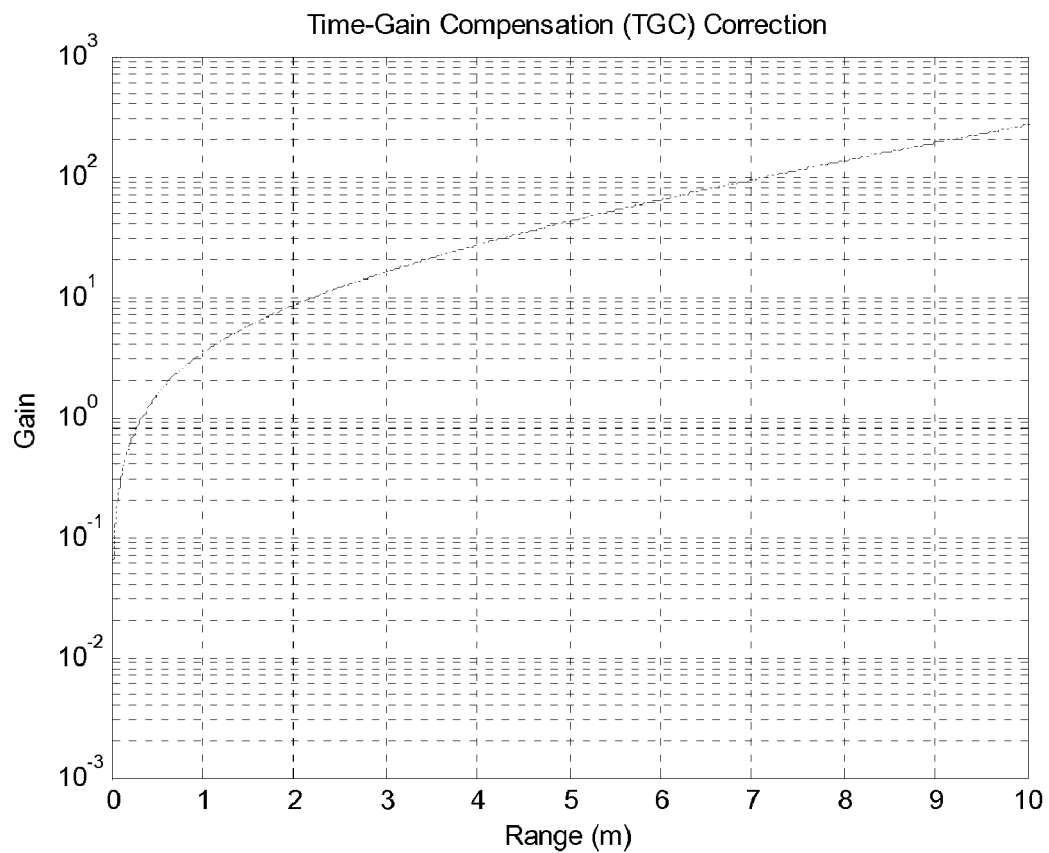
FIG. 14 shows graph of time gain compensation with respect to transducer range.

The range dependent attenuations defined above can be compensated in the DSP process (FIG. 9) with a TGC function. The time-gain compensation is applied to the voltage of the received pulse. The TGC function with respect to range is plotted in FIG. 14.

A TGC amplifier should have a dynamic range of about 60-70 dB. For pulses emitted less than approximately 0.5 meters from the base unit, the received pulse will have to be attenuated to protect the electronics of the base unit.

Figure 15:
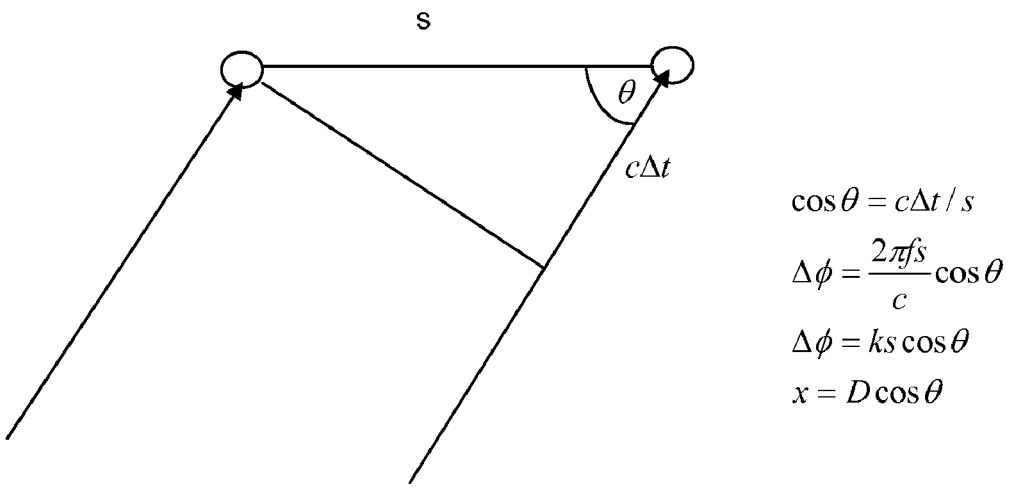
FIG. 15 shows a graph of a technique for range and direction determination.

The equations for locating the client device so far used have been what may be referred to as far-field expressions; that is to say the arrivals at separated sensors are parallel, and thus an angle of arrival can be sensibly defined (see FIG. 15). The range to the transponder is known, having been determined by another method known in the art.

By measuring the phase difference $\Delta\phi$ between acoustic signals at each of the receiving transducers, a time delay $\Delta t$ between the arrivals at the two sensors shown in FIG. 15 is determined. As explained earlier, if the sensor spacing is greater than a half wavelength then ambiguities in the phase difference occur and such ambiguity can be resolved by having three sensors with differential spacing of one-half wavelength.

Figure 16:
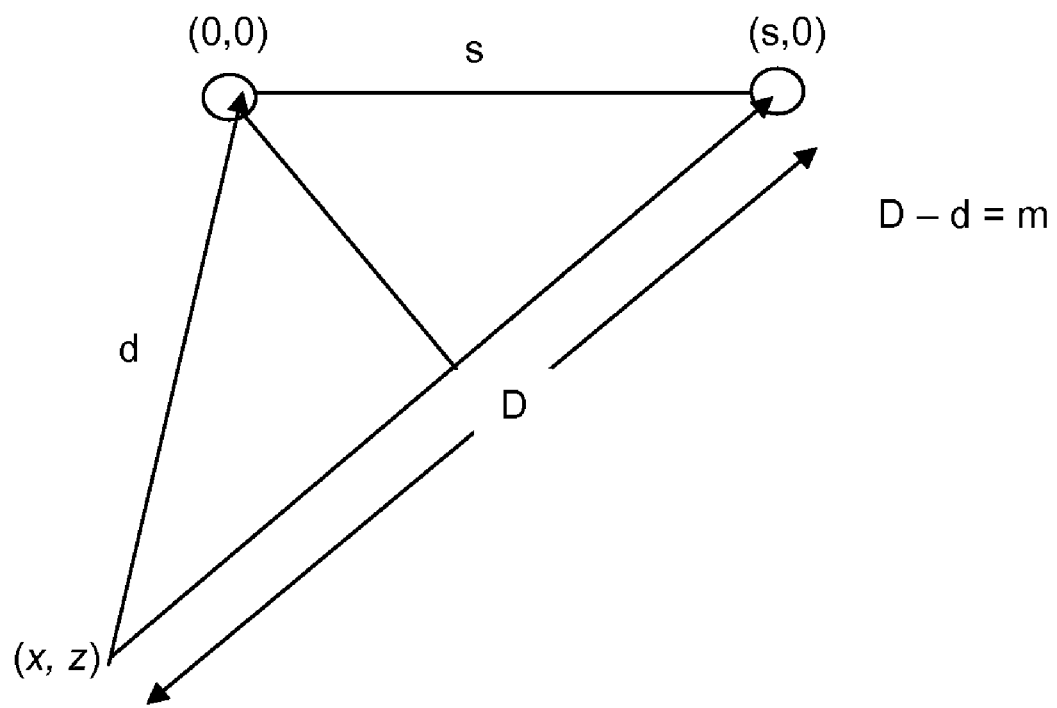
FIG. 16 shows a graph explaining range and direction determination.

The analysis below is presented in terms of time delays between transducers expressed equivalently as an extra travel distance m. These time delays will have been obtained by measuring arrival times of ultrasound pulses at each sensor to an accuracy of about one cycle (or 25 microseconds), wherein signals are measured using three sensors arranged in each of two orthogonal lines. Arrival times are measured robustly using only the leading cycles of the received pulse, thereby avoiding multipath pulses that corrupt the received signals. In the near field case the signal arrivals at separated receivers are not parallel, as shown in FIG. 16, and explanation of determining arrival direction in terms of an arrival angle is not appropriate. The difference in arrival times expressed as a distance m contains information relevant to the range D.

Here, as in the far field case above, the problem is presented in two dimensions (the 3D solution follows readily). The transmitter is at the location (x, z) and receiving points are at (0, 0) and (s, 0). The arrival time delay between the two receiving points expressed as an extra distance m is given by the expressions:

$$m = D - d$$

$$D = \sqrt{x^2 + z^2}$$

$$d = \sqrt{((x-s)^2 + z^2)}$$

Solving the above expressions for position x with respect to D, m and s, provides the expression:

$$x = \frac{2Dm - m^2 + s^2}{2s} = \left(\frac{m}{s}\right)D + \left(\frac{-m^2 + s^2}{2s}\right) = \alpha D + \beta,$$

where α and β are constants equal to the corresponding terms in brackets in the foregoing expression.

The distance D is obtained by the detailed range algorithm already explained. Once x is determined, z is obtained from the expression:

$$z = \sqrt{D^2 - x^2}$$

It can be observed that when D>>s, then β=0 and α=cos θ which corresponds to the far field case. Use of the near field equations presents no extra complexity in the signal processing and leads to enhanced accuracy.

The base station (e.g., BASE-1 in FIG. 1) should be calibrated after installation at the point of use such that its absolute position and orientation are determined. The final output of the digital signal processing procedure (FIG. 9) will then be the coordinate transformation from the relative coordinates (range, bearing angles) to an absolute measure of position in three dimensions (X, Y, Z).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining position of a mobile electronic device within a building, comprising:
   emitting, in the building at least one of an electromagnetic and an optical initiation signal from the mobile electronic device;
   identifying the mobile device by detecting the initiation signal at a base station disposed in the building;
   transmitting a control signal from the base station to cause emitting an acoustic pulse from the position of the mobile electronic device;
   detecting the acoustic pulse at the base station at at least three known spaced apart locations along each of at least two lines extending in different directions;
   determining the time differences of arrival of acoustic pulses at each of the detecting locations;
   determining a phase difference of the acoustic pulse between each of the detecting locations;
   determining a relative position of the device with respect to the base station known position from the time differences of arrival and phase differences; and
   at least one of storing or displaying the relative position.

2. The method of claim 1 wherein the at least two lines are orthogonal.

3. The method of claim 1 further comprising determining an absolute position of the device from the relative position.

4. The method of claim 1 wherein a difference between spacing of a first one of the detecting locations and a second one of the detecting locations, and the second one of the detecting locations and a third one of the detecting locations is equal to one-half a wavelength of the acoustic pulse.

5. The method of claim 1 further comprising communicating the relative position between the known position and the mobile device using at least one of a ultrasonic frequency channel, radio frequency channel and/or an infrared channel.

6. The method of claim 1 further comprising emitting an acoustic pulse from the known location, detecting the acoustic pulse from the known location and emitting the acoustic pulse from the mobile device in response to detecting the acoustic pulse from the known location.

7. The method of claim 1 further comprising synchronizing timing devices at the known location with synchronizing devices in the mobile device by transferring timing information over at least one of a radio frequency channel and an infrared channel.

8. The method of claim 1 wherein the phase differences are determined by narrowband phase difference algorithms applied to signals detected at each of the known locations with at least one other signal detected at the known locations.

9. The method of claim 1 wherein the mobile device comprises a smart tag.

10. The method of claim 1 wherein the mobile device comprises a cellular telephone.

11. The method of claim 1 wherein the acoustic pulse comprises a selected number of cycles at a single frequency.

12. The method of claim 1 further comprising:
   causing at least a second mobile electronic device to emit at least one of an electromagnetic and optical initiation signal;
   detecting the second device initiation signal at the base station;
   identifying the second mobile electronic device using the detected second device initiation signal;
   after a predetermined time related to transmission time of the acoustic pulse from the first mobile electronic device;

transmitting a control signal from the base station to cause the second mobile electronic device to emit an acoustic signal;

detecting the second device acoustic signal at the base station at the three known spaced apart locations along each of at least two lines extending in different directions;

determining the time differences of arrival of acoustic pulses from the second device acoustic signal at each of the detecting locations;

determining a phase difference of the acoustic pulses from the second device acoustic signal between each of the detecting locations;

determining a relative position of at least the second mobile electronic device with respect to the known position from the time differences of arrival and phase differences; and at least one of storing or displaying the relative position.

* * * * *